(12) United States Patent
Liu et al.

(10) Patent No.: US 9,264,435 B2
(45) Date of Patent: Feb. 16, 2016

(54) APPARATUS AND METHODS FOR ACCESS SOLUTIONS TO WIRELESS AND WIRED NETWORKS

(75) Inventors: Hanyang Liu, Cupertino, CA (US); Sebastian George Tonkin, San Francisco, CA (US)

(73) Assignee: Boingo Wireless, Inc., Los Angeles, CA (US)

( * ) Notice: Subject to any disclaimer, the term of this patent is extended or adjusted under 35 U.S.C. 154(b) by 472 days.

(21) Appl. No.: 13/027,989

(22) Filed: Feb. 15, 2011

(65) Prior Publication Data
US 2012/0210011 A1  Aug. 16, 2012

(51) Int. Cl.
  H04L 29/06  (2006.01)
  H04L 29/08  (2006.01)
  H04W 12/08  (2009.01)
  H04W 84/12  (2009.01)

(52) U.S. Cl.
  CPC ............... *H04L 63/10* (2013.01); *H04L 67/02* (2013.01); *H04W 12/08* (2013.01); *H04W 84/12* (2013.01)

(58) Field of Classification Search
  CPC .............. G06F 15/16; G06F 17/30873; H04L 29/08621; H04L 63/10
  USPC .................................................. 709/229, 223
  See application file for complete search history.

(56) References Cited

U.S. PATENT DOCUMENTS

| | | | | |
|---|---|---|---|---|
| 5,742,768 | A * | 4/1998 | Gennaro et al. | 709/203 |
| 5,761,683 | A * | 6/1998 | Logan et al. | 715/206 |
| 6,144,991 | A * | 11/2000 | England | 709/205 |
| 6,278,448 | B1 * | 8/2001 | Brown et al. | 715/866 |
| 6,282,548 | B1 * | 8/2001 | Burner et al. | |
| 6,401,077 | B1 * | 6/2002 | Godden et al. | 705/26.8 |
| 6,718,328 | B1 * | 4/2004 | Norris | 709/229 |
| 6,839,742 | B1 * | 1/2005 | Dyer et al. | 709/217 |
| 7,003,565 | B2 * | 2/2006 | Hind et al. | 709/224 |
| 7,200,804 | B1 * | 4/2007 | Khavari | G06F 17/243 707/E17.108 |
| 7,263,076 | B1 * | 8/2007 | Leibovitz et al. | 370/310 |
| 7,305,624 | B1 * | 12/2007 | Siegel | 715/738 |
| 7,415,537 | B1 * | 8/2008 | Maes | 709/246 |
| 7,475,146 | B2 * | 1/2009 | Bazot | G06F 21/41 709/227 |
| 7,493,414 | B2 * | 2/2009 | Tazuma | 709/239 |
| 7,519,902 | B1 * | 4/2009 | Kraft et al. | 715/234 |
| 7,890,612 | B2 * | 2/2011 | Todd et al. | 709/220 |

(Continued)

OTHER PUBLICATIONS

Fielding et al., "Hypertext Transfer Protocol—HTTP/1.1", 1999.*

(Continued)

*Primary Examiner* — O. C. Vostal
(74) *Attorney, Agent, or Firm* — Lapple Ubell IP Law, LLP; Franklin D. Ubell (57) ABSTRACT

A method, apparatus, and system in which a module may have both an embeddable portion and a cooperating downloadable portion scripted to plug in and be integrated into an existing Terms and Condition page of a public Wi-Fi and/or wired network. The module is scripted to cause an injection of a third-party captive portal and authentication flow when the client device with a resident browser application contacts a host gateway or other host controller to undergo a sign on experience as a guest to access/connect into a public Wi-Fi and/or wired network. The module is also scripted to direct the web browser back to the Terms and Condition page once the web browser of the client device has been through the third-party captive portal and authentication flow and its associated one or more web pages that are parsed and rendered by the web browser.

17 Claims, 2 Drawing Sheets

(56) References Cited

U.S. PATENT DOCUMENTS

| | | | |
|---|---|---|---|
| 7,904,953 B2* | 3/2011 | Meyer et al. ................. 726/12 |
| 8,000,276 B2* | 8/2011 | Scherzer et al. ........... 370/310.1 |
| 8,005,816 B2* | 8/2011 | Krishnaprasad .. G06F 17/30286 707/709 |
| 8,136,151 B2* | 3/2012 | Smith et al. ..................... 726/15 |
| 8,332,464 B2* | 12/2012 | Dispensa ............ H04L 29/12009 709/203 |
| 8,370,420 B1* | 2/2013 | Decasper .......... G06F 17/30902 709/202 |
| 8,543,715 B1* | 9/2013 | Rabbat et al. ................. 709/229 |
| 8,707,451 B2* | 4/2014 | Ture et al. ....................... 726/28 |
| 2001/0039587 A1* | 11/2001 | Uhler ..................... H04L 29/06 709/229 |
| 2002/0156905 A1* | 10/2002 | Weissman ............ H04L 29/06 709/229 |
| 2002/0161901 A1* | 10/2002 | Weissman ............. G01V 1/282 709/229 |
| 2002/0162002 A1* | 10/2002 | Gunter et al. ................. 713/176 |
| 2002/0178213 A1* | 11/2002 | Parry ........................... 709/203 |
| 2003/0005152 A1* | 1/2003 | Diwan et al. ................. 709/239 |
| 2004/0006598 A1* | 1/2004 | Bargagli Damm et al. ... 709/206 |
| 2004/0205569 A1* | 10/2004 | McCarty et al. .............. 715/513 |
| 2005/0044224 A1* | 2/2005 | Jun et al. ....................... 709/225 |
| 2005/0060646 A1* | 3/2005 | Gauthier et al. .............. 715/513 |
| 2006/0015564 A1* | 1/2006 | Angelica ....................... 709/206 |
| 2006/0031404 A1* | 2/2006 | Kassab ......................... 709/218 |
| 2006/0075024 A1* | 4/2006 | Zircher et al. ................. 709/205 |
| 2006/0136294 A1* | 6/2006 | Linden et al. ................... 705/14 |
| 2006/0185021 A1* | 8/2006 | Dujari et al. .................. 726/27 |
| 2006/0212803 A1* | 9/2006 | Arokiaswamy ... G06F 17/30893 715/201 |
| 2006/0233375 A1* | 10/2006 | Lillie et al. .................... 380/270 |
| 2006/0288100 A1* | 12/2006 | Carson et al. ................. 709/224 |
| 2007/0005795 A1* | 1/2007 | Gonzalez ..................... 709/232 |
| 2007/0058621 A1* | 3/2007 | Okmianski et al. ........... 370/389 |
| 2007/0067431 A1* | 3/2007 | Yoshihara et al. ............ 709/223 |
| 2007/0171921 A1* | 7/2007 | Wookey ................ G06F 3/1415 370/401 |
| 2008/0114866 A1* | 5/2008 | Round ........................... 709/223 |
| 2008/0119165 A1* | 5/2008 | Mittal et al. ................... 455/411 |
| 2008/0147814 A1* | 6/2008 | Damm et al. .................. 709/206 |
| 2008/0189192 A1* | 8/2008 | Ronen et al. ................... 705/26 |
| 2008/0201118 A1* | 8/2008 | Luo ................................. 703/2 |
| 2008/0300967 A1* | 12/2008 | Buckley et al. ................. 705/10 |
| 2009/0063984 A1* | 3/2009 | Agarwal et al. ............... 715/733 |
| 2009/0132543 A1* | 5/2009 | Chatley et al. ................. 707/10 |
| 2009/0132640 A1* | 5/2009 | Verma et al. .................. 709/203 |
| 2009/0158190 A1* | 6/2009 | Higginson ..................... 715/773 |
| 2009/0177587 A1* | 7/2009 | Siegal et al. .................... 705/67 |
| 2009/0292814 A1* | 11/2009 | Ting et al. ..................... 709/229 |
| 2009/0313116 A1* | 12/2009 | Ashbaugh .................... 705/14.47 |
| 2010/0042735 A1* | 2/2010 | Blinn et al. .................... 709/229 |
| 2010/0064234 A1* | 3/2010 | Schreiber ........... G06Q 30/0273 715/760 |
| 2010/0070562 A1* | 3/2010 | Boyer et al. ................... 709/203 |
| 2010/0070876 A1* | 3/2010 | Jain et al. ....................... 715/748 |
| 2010/0106562 A1* | 4/2010 | Taylor et al. .................... 705/10 |
| 2010/0124196 A1* | 5/2010 | Bonar et al. ................... 370/329 |
| 2010/0138485 A1* | 6/2010 | Chow et al. ................... 709/203 |
| 2010/0211796 A1* | 8/2010 | Gailey et al. .................. 713/182 |
| 2010/0263022 A1* | 10/2010 | Wynn et al. ...................... 726/3 |
| 2010/0268609 A1* | 10/2010 | Nolet et al. ................. 705/14.71 |
| 2010/0274884 A1* | 10/2010 | Uematsu et al. .............. 709/223 |
| 2010/0299438 A1* | 11/2010 | Zimmerman et al. ........ 709/226 |
| 2010/0306059 A1* | 12/2010 | Rettig et al. ................. 705/14.58 |
| 2010/0332615 A1* | 12/2010 | Short et al. .................... 709/217 |
| 2011/0022496 A1* | 1/2011 | Johnson et al. ............ 705/26.41 |
| 2011/0022704 A1* | 1/2011 | Duan et al. .................... 709/224 |
| 2011/0047611 A1* | 2/2011 | Hayler et al. .................... 726/12 |
| 2011/0055314 A1* | 3/2011 | Rosenstein ....... G06F 17/30899 709/203 |
| 2011/0060838 A1* | 3/2011 | Yeung et al. ................... 709/228 |
| 2011/0072038 A1* | 3/2011 | Burge .......................... 707/769 |
| 2011/0078708 A1* | 3/2011 | Dokovski et al. ............. 719/329 |
| 2011/0125575 A1* | 5/2011 | Lasker et al. ............... 705/14.53 |
| 2011/0145218 A1* | 6/2011 | Meyerzon et al. ............ 707/709 |
| 2011/0154130 A1* | 6/2011 | Helander ................ G06F 21/51 714/48 |
| 2011/0173071 A1* | 7/2011 | Meyer et al. ............... 705/14.54 |
| 2011/0179165 A1* | 7/2011 | Ravichandran ............... 709/224 |
| 2011/0179204 A1* | 7/2011 | Hulbert et al. .................. 710/74 |
| 2011/0225637 A1* | 9/2011 | Counterman ..................... 726/7 |
| 2012/0005738 A1* | 1/2012 | Manini et al. ..................... 726/7 |
| 2012/0005745 A1* | 1/2012 | Wei et al. ......................... 726/15 |
| 2012/0008786 A1* | 1/2012 | Cronk et al. .................. 380/282 |
| 2012/0079577 A1* | 3/2012 | Hao ......................... H04L 63/10 726/7 |
| 2012/0084644 A1* | 4/2012 | Robert et al. ................. 715/255 |
| 2012/0116873 A1* | 5/2012 | Damm et al. .............. 705/14.49 |
| 2012/0155396 A1* | 6/2012 | Gammon ....................... 370/329 |
| 2012/0167185 A1* | 6/2012 | Menezes et al. .................. 726/5 |
| 2012/0167217 A1* | 6/2012 | McReynolds .................. 726/24 |
| 2012/0184242 A1* | 7/2012 | Li et al. ......................... 455/406 |
| 2012/0209907 A1* | 8/2012 | Andrews et al. .............. 709/204 |
| 2012/0210413 A1* | 8/2012 | Akula ................. H04L 63/0815 726/8 |
| 2012/0222117 A1* | 8/2012 | Wong et al. .................... 726/23 |

OTHER PUBLICATIONS

Brunato et al., "WilmaGate: a New Open Access Gateway for Hotspot Management", 2005.*

Tukkensaeter, "User Friendly Access Solutions for Mobile WiMAX", 2009.*

Purdila et al., "A Dynamic Browser Containment Environment for Countering Web-based Malware", 2009.*

MDN, "<iframe>", 2015.* w3schools, "HTML <iframe> src Attribute", 1999-2015.*

* cited by examiner

APPARATUS AND METHODS FOR ACCESS SOLUTIONS TO WIRELESS AND WIRED NETWORKS

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to third party authentication of access to both wireless and wired public networks.

BACKGROUND OF THE INVENTION

Some methods of trying to access public networks required direct interaction with protocol and configuration setting of the host controller/gateway itself. A wide variety of host controller/gateway exist making each set up non-standard and a non-standard sign on experience from multiple controllers owned and operated by the same Wi-Fi provider.

SUMMARY OF THE INVENTION

Various methods and apparatus are discussed for a client-server environment. A module may have both an embeddable portion and a cooperating downloadable portion scripted to plug in and be integrated into an existing Terms and Condition page of a public Wi-Fi and/or wired network. The module is scripted in a compatible programming language as the client-side web browser application resident on a client device. The module is scripted to cause an injection of a third-party captive portal and authentication flow when the client device with a resident browser application contacts a host gateway or other host controller to undergo a sign on experience as a guest to access/connect into a public Wi-Fi and/or wired network. The Terms and Condition page is generally the first web page the web browser fetches and attempts to render on a display of the client device and can go by different names including a Wi-Fi Sign-in Page, a Splash page, Login page, Host portal page, or similar webpage. The module is also scripted to direct the web browser back to the Terms and Condition page once the web browser of the client device has been through the third-party captive portal and authentication flow and its associated one or more web pages that are parsed and rendered by the web browser. Any portions of the module coded in software are tangibly stored on a computing machine readable media in an executable format.

BRIEF DESCRIPTION OF THE DRAWINGS

The drawings refer to embodiments of the invention in which.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, number of web pages, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first server, may be made. However, the specific numeric reference should not be interpreted as a literal sequential order but rather interpreted that the first server is different than a second server. Thus, the specific details set forth are merely exemplary. The specific details may be varied from and still be contemplated to be within the spirit and scope of the present invention.

In general, a method, apparatus, and system in which a module may have both an embeddable portion and a cooperating downloadable portion scripted to plug in and be integrated into an existing Terms and Condition page of a public Wi-Fi and/or wired network. The module is scripted to cause an injection of a third-party captive portal and authentication flow when the client device with a resident browser application contacts a host gateway or other host controller to undergo a sign on experience as a guest to access/connect into a public Wi-Fi and/or wired network. The module is also scripted to direct the web browser back to the Terms and Condition page once the web browser of the client device has been through the third-party captive portal and authentication flow and its associated one or more web pages that are parsed and rendered by the web browser.

Figure 1:
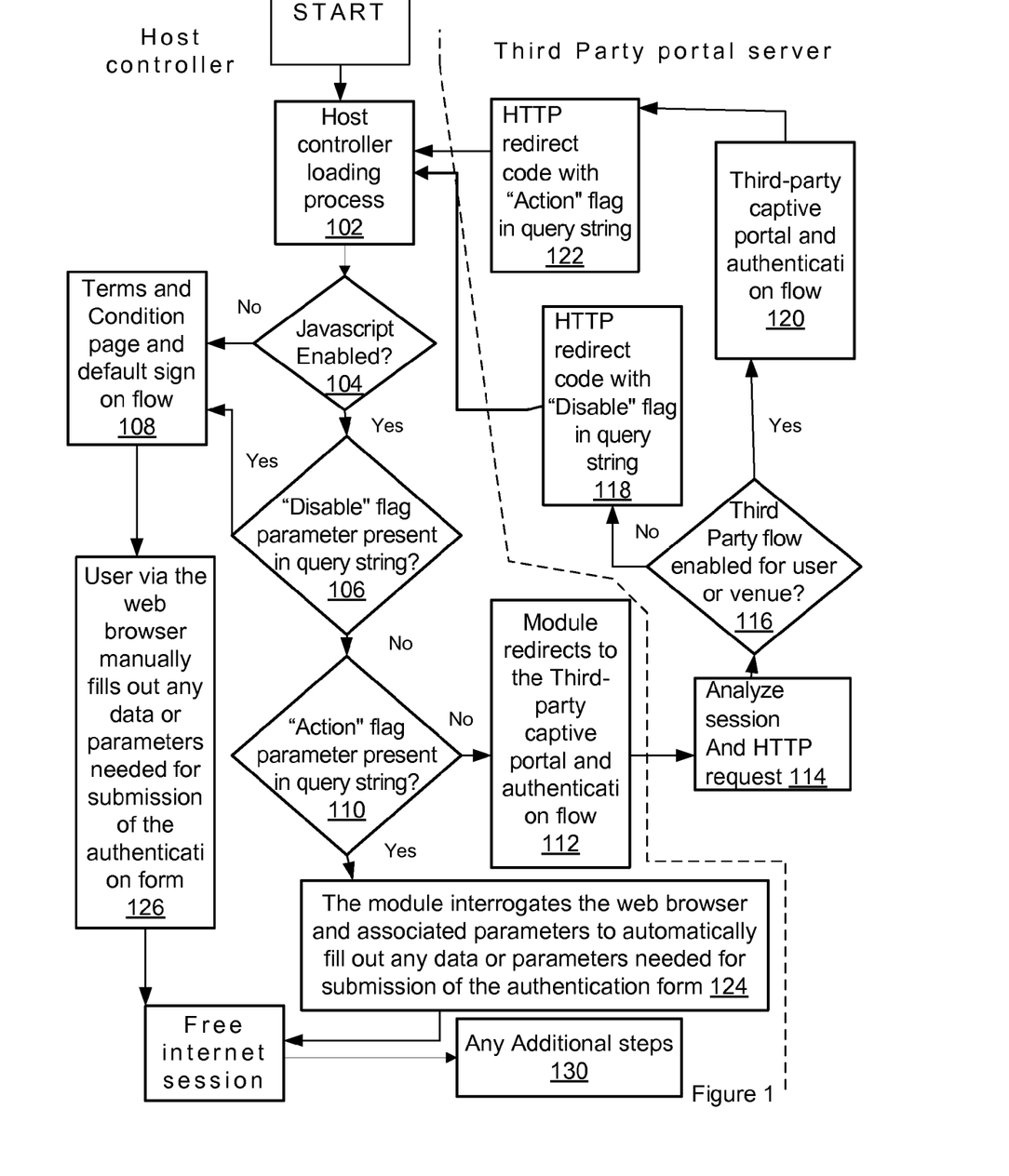
FIG. 1 illustrates an example flow of the module scripted to cause an injection of a third-party captive portal and authentication flow, its host controllers flow, and guest software on the third party server flow.
Figure 2:
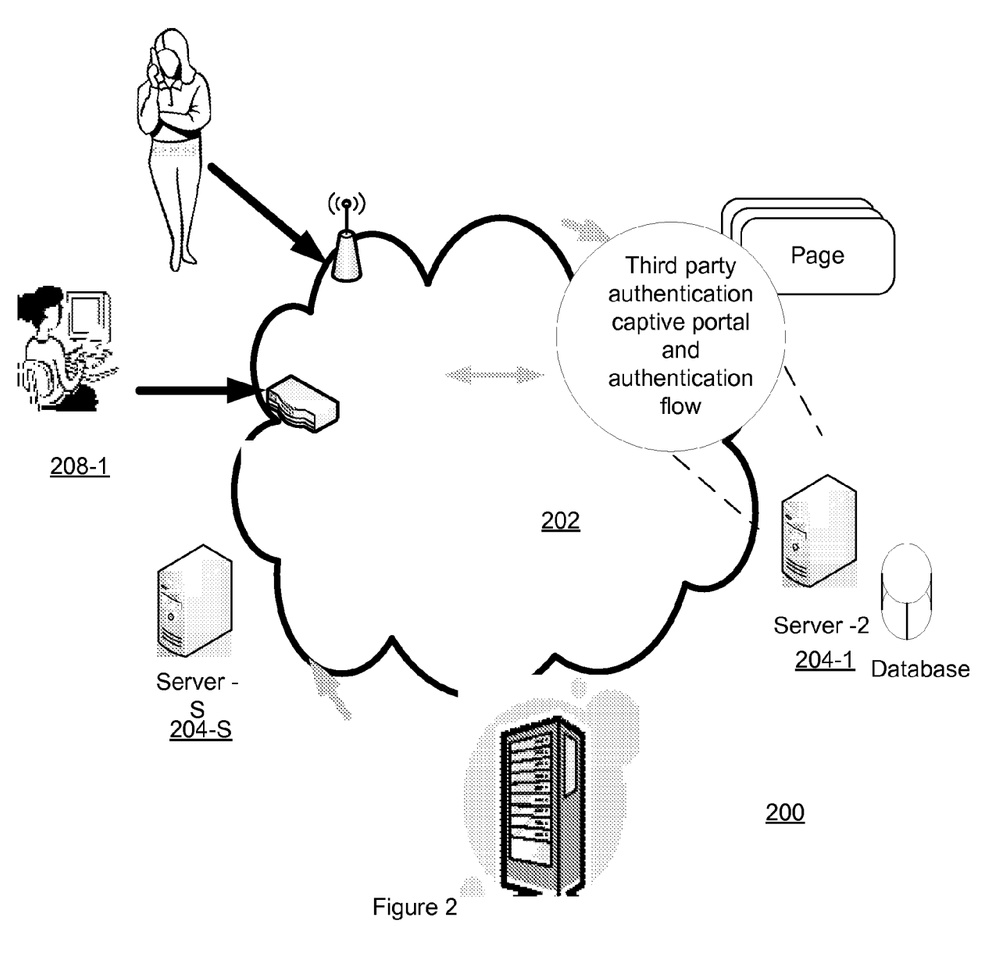
FIG. 2 illustrates a network environment 200 in which the techniques described may be applied.

Illustrative environments in which the present design can be used will be discussed in FIGS. 1 and 2. FIG. 1 illustrates an example flow of the module scripted to cause an injection of the third-party captive portal and authentication flow, its host controller's flow, and guest software on the third party server flow. FIG. 2 illustrates a network environment 200 in which the techniques described may be applied. The network environment 200 has a network 202 that connects S number of servers 204-1 through 204-S, and C number of clients 208-1 through 208-C. More details are discussed later below.

Overall, when installed, the module will generally perform an instantaneous redirect away from a default Terms and Condition (T & C) page of the public Wi-Fi and/or wired network over to the third-party captive portal and authentication flow process hosted on the third party server, in effect replacing the original default flow for users of client devices that have their browser's JavaScript enabled. In addition to de facto replacing public WiFi and/or wired network current T&C page flow (a.k.a. the host device's home portal page), the JavaScript snippet will also handle the authentication action to gain entry to the network when the user has completed the third-party captive portal and authentication flow process. The web browser of the client device can be redirected, such as through a HTTP 302 Redirect code, by the JavaScript snippet, embedded with captive host portal software, one or more times until the web browser of the client device reaches the URL of the third party hosted "splash page" and the other web pages served by the third party server.

The module may be implemented in client-side JavaScript to integrate with the T & C page and be parsed by the web browser of the client device when the T & C page is fetched; and thereby, work with diverse types of public Wi-Fi and/or wired network host gateway and host controller equipment, each with their own different configuration but each configuration commonly supports a captive portal with an editable Terms and Condition page and a walled garden policy to give the ability to white list a third party Guest server and its served web pages by 1) IP address 2) name or 3) combination of both. The embeddable portion of the module is scripted to plug in and be integrated into the editable Terms and Condition page of the public Wi-Fi and/or wired network.

The gateway or other form of controller is scripted to implement the captive portal technique to force each HTTP client access the network to see its default T&C page for the authentication flow before using the Internet normally. The gateway or other form of controller is scripted with the embedded portion of the module resident to be redirected to see the third party web pages for the authentication flow before using the Internet normally. When the gateway or other form of controller is going to fetch its T & C webpage, then the embedded portion of the module is part of that T & C webpage that is fetched.

The following is an example algorithm/flow process.

In step 102, the client device with a resident browser application contacts the gateway or other controller to undergo the sign on experience as a guest to access/connect into the public Wi-Fi and/or wired network. The gateway or other controller has a T & C Page (loading state) that contains the embeddable portion of the module. The embeddable portion of the module, such as the embeddable JavaScript snippet, is scripted to plug in and be integrated into any existing Terms and Condition page of a public WiFi and/or wired network. The host gateway or other form of controller is configured to fetch its T & C webpage and the module embeds as part of that T & C webpage. In a WiFi scenario, the user is redirected here by the captive portal software on the controller, usually with parameters in the query string that indicates the user's IP address, MAC address, and authentication challenge tokens. None of these parameters in the query string are generally predictable or deducible from an external host. Thus, these parameters need to be communicated while other parameter associated with the authentication process may be stored on the third party server. These unpredictable parameters are used later by the page to fill out an authentication form that the user can submit to gain access to the Internet. Note, in step 112, the web browser of the client device will have been redirected from the Terms and Condition page of the host controller over to the URL of the third-party captive portal and authentication flow process on the third party server along with any unpredictable GET parameters that are necessary for authentication on the Terms and Condition page by the downloadable portion of the module. Note, if username/passwords/access codes are required for sign on, the ability to assign a temporary credential for the campaign is required and these are carried in the guest set up flow as cookies or other ways to maintain them during the guest set up flow. In this process step 102, the T&C page is still in the process of loading.

Also, the module with its embeddable and downloadable portions are coded to make a consistent, centrally-managed and hosted captive portal experience across a plurality of host controllers. The two or more of the host controllers, such as gateways from a same hotel chain at different geographic locations, may have disparate hardware setups. These gateways may or may not have hardware setups configured to support external authentication. However, the module is scripted to cause an injection of a third-party captive portal and authentication flow as long as each of the two or more host controllers implement a walled garden policy for the address of the third party server and has a customizable T & C page that can embed the embeddable portion of the module.

In step 104, if the web browser of the client device of the user, such as mobile phone or lap top, is configured/set as JavaScript enabled, the embeddable JavaScript snippet of the module is configured to take action before the web page renders in the browser; and thereby, make those actions/processes taking place in steps 106, 110, 112, and 124 essentially transparent to the user. The embeddable JavaScript snippet when parsed by the web browser calls for a downloadable portion of the module, such as an asset JavaScript file, from the third party server to be downloaded potentially with any other objects and files needed to make up the T&C web page. Likewise, as the web browser parses the objects and files of the webpage to render the T&C web page on a display of the client device, the web browser will parse the downloadable portion of the module that is scripted to direct the injection of the third-party captive portal and authentication flow, via the web browser parsing, when the browser of a client device initiates the sign on experience to make at least processes in steps 106, 110, 112, and 124 happen. The JavaScript is loaded and the web browser parses the HTTP GET parameters in the query string of the page's URL. The downloadable portion of the module is scripted for injection of a third-party captive portal and authentication flow into the web browser parsing process when the browser of a client device initiates the sign on experience.

In step 106, upon loading, the embeddable portion of the module is configured to examine the URL string for parameters that tell it how to proceed. A first parameter the module looks for may be a "disable" flag. When the disable flag is present, the module script understands this third-party captive portal and authentication flow has been remotely turned off and the web browser of the client device will be directed to the standard T & C Page flow of the host controller in step 108. Thus, the JavaScript is loaded and the web browser parses the HTTP GET parameters in the query string of the page's URL and when the web browser parses the HTTP parameters that contain a "disable" flag, then the web browser of the client machine is directed to the normal host controller/portal flow. Another parameter the module looks for may be an "action" flag. When the action flag is present, the module scripted code proceeds to present any authentication parameters needed to proceed through the T & C page of the host controller in step 124.

The embeddable portion of module is also scripted to proceed through to the T & C page of the host controller in step 108 when the third party portal server becomes unreachable after a set period of time. Thus, the embeddable portion of module is scripted to allow the Wi-Fi connection experience to be turned on or off remotely for 1) a particular user, 2) a given venue location, and 3) both based on, for example, a client device's ID or user's ID past session information while defaulting gracefully to the standard connection experience configured for the host controller 1) for users that are not being targeted, and thus the ID does not match, or 2) when the third party server becomes unreachable.

In step 108, the Host controller/portal page flow is essentially the gateway's/controller's unmodified captive portal and authentication flow to allow the user of the client device under go the sign on experience as a guest to access/connect into the public Wi-Fi and/or wired network. In a WiFi advertising context, this host controller's T & C webpage would serve as a fall back 1) in case the third party server is unreachable, 2) the web browser does not have JavaScript enabled, 3) if advertisements could not been allocated for the client device, and 4) any combination of the three. The T & C page in its loaded state allows the web browser of the client device to proceed with the target action (i.e. Wi-Fi login) by manually triggering the action event in step 126. In step 126, the host portal page loads with its terms and conditions that the user must manually click/accept to enter through to get into the public Wi-Fi and/or wired network, and thus later into the internet.

In step 110, when the snippet module is not disabled by the disable flag in step 106, the downloadable portion of the module looks for an "action" flag in the URL string or http request information. If the "action flag" is present, the downloadable portion of the module triggers the Target Action (i.e. Wi-Fi/wired public network login) transparently and without user interaction. If the "action flag" is absent, the module will redirect (112) the web browser of the client device to the third party Guest Portal location. Thus, the module is further scripted when both the "disable flag" and the "action flag" in the HTTP parameters are not present, then the web browser is redirected to the URL of the third party server before any web page is rendered by the web browser, and a temporary graphic indicating loading is presented on the display of the client device instead. The module is coded then to cause the host controller T & C page's complete URL and including GET parameters necessary for login, to be passed as a parameter to the third-party captive portal and authentication flow during the redirect.

In step 112, the embeddable portion of the module is coded to give an indication of 1) an owner of the gateway or other controller to the public Wi-Fi and/or wired network, 2) geographic location of the gateway or other controller to the public Wi-Fi and/or wired network, and any combination of both. The downloadable portion of the of the module is coded in part to redirect the web browser to a proper version of the scripted third-party captive portal and authentication flow dependent on the indication of ownership or geographic location communicated by the embeddable portion. The JavaScript code of the downloadable module redirects the web browser to this new URL location of the third party server and its associated web pages via the browser parsing this information and then the web browser interfacing/interacting with the host controller to perform its standard network addressing and routing functionality. The downloadable snippet does not directly interact with the controller rather the downloadable snippet interacts with the browser application by having the browser parse its code as browser application is standardly coded to do. Further, the browser application interacts with controller/gateway as the browser application is standardly coded to do. The redirection of the web browser can be done by setting the location property of an active window to the URL of the third party server and one or more of its web pages while appending a parameter indicating the URL of the T & C Page. Most of the time, the downloadable portion of module is scripted to direct the web browser one or more times until the web browser reaches and proceeds through the web pages of the third-party captive portal and authentication flow. The embeddable portion of the module configures the host controller or an intermediate page to issue a HTTP redirect status code to the URL of the web pages of the third-party captive portal and authentication flow, and when the T & C page is hosted within an iFrame, integration of the embeddable portion involves setting the SRC attribute of the iFrame to the first web page of the third-party captive portal and authentication flow. The first web page/splash page of the third party flow is usually co-branded between the venue, network provider, and advertiser. The module is also coded to send control information via the web browser's http request, including cookies and HTTP GET parameters to be analyzed and recorded by the Guest Portal software coded in the third party captive portal and authentication flow.

In step 114, the user's http request, including cookies and HTTP GET parameters can be analyzed and recorded by the Guest Portal software at this step. The host controller T&C Page URL along with any modifications made by the snippet is retained by the third party server to control the flow.

In step 116, the module is coded to pass information via the web browser to cause the Guest Portal software on the third party server to determine whether the client device should be directed through the third-party captive portal and authentication flow in lieu of the Host controller default sign-on flow. If not, when the Guest Portal software determines the third-party captive portal and authentication flow should be complete for this client device, then the Guest Portal software issues a HTTP 302 redirect back to the Host controller URL while appending a GET parameter flag intended to communicate to the module to disable redirecting the web browser to the third-party captive portal and authentication flow. Otherwise, the Guest Portal software directs the user to continue with the Guest Portal flow. Thus, when the analysis (in step 114) determines that the user should not enter into the Guest Portal flow, they will be redirected to the Host Portal Page URL with a "disable" flag in the accompanying HTTP parameters (see step 118). Otherwise, the Guest Portal software at this step directs the web browser of the client device to enters into the Guest Portal flow (see step 120).

In step 118, the browser of the client device is redirected to the Host Portal Page URL with a "disable" flag in the accompanying HTTP parameters so that the decision point in step 106 of the process will result in "YES" and access the public network rather be directed through the third-party captive portal and authentication flow again.

In step 120, the third-party captive portal and authentication flow and its associated one or more web pages that are parsed and rendered by the web browser are configured to deliver a consistent, centrally-hosted connection experience across diverse types of Wi-Fi equipment and configurations for the purposes of one or more of 1) displaying advertising, 2) maintaining a consistent guest experience, 3) delivering marketing messages, 4) consolidated tracking of client devices accessing the public Wi-Fi and/or wired network, 5) interrogation of cookies and MAC addresses of the client device seeking access to the public Wi-Fi and/or wired network, and 6) other similar process. At least two or more host controllers, each a different type of Wi-Fi equipment but from a common owner, will all have the same consistent guest experience, same advertising and same marketing messages presented to the web browsers of these two or more host controllers. The downloadable Asset file JavaScript file of the module can cause the browser to be redirected to this third party server and its served web pages which require the authentication, payment, acceptance of use terms and conditions policy, and connection to marketers and advertisers for users when these users undergo the sign on experience as [a guest] to [access] connect into the public WiFi and/or wired network. In an example, the third-party captive portal and authentication flow is scripted such that after clicking a mouse to accept the Terms & Conditions policy (i.e. clicking "Connect"), the web browser of the client device will render on its display a Promo Page and see a full-page HTML-based creative from the advertiser. Some advertisements have a target conversion action while others are animations that automatically redirect the user upon finishing. Thus, the third party web page that mimics the T & C page redirects the web browser of the client device to the URL address of one or more advertising or promo pages where they will be issued a HTTP redirect status code, such as a 302 status code, to either another promo or onwards toward authentication, depending on the coded string in the downloadable portion of the module and the user's promo interaction history stored in the third party server. Also, when the guest software on the third party server interrogates the cookies of the client device and sees that this client device has previously visited specific promo pages, then the web browser can be directed to alternative promo pages.

Note, with the Host Portal Page URL, the Guest Portal server software may trigger the Target Action (such as granting a Wi-Fi session) at any point during the flow. In a captive portal, the flow and JavaScript snippet can be configured to prevent the user from gaining access to the broader internet without explicitly completing all steps in the Guest Portal flow.

As discussed, the downloadable portion of the module may be scripted to cause the web browser to be redirected to one or more third party web pages that require two or more of the following 1) authentication of the user, 2) payment, 3) agreement to an acceptable use term and conditions policy, 4) viewing of one or more advertisement when these users undergo the sign on experience as a guest to access the public WiFi and/or wired network. However, this experience is common for all of the host controllers from that same public network service provider. Thus, multiple host controllers operated by this common entity are directed to the same one or more third party web pages to give the common experience.

A web page served by the third party server that includes the agreement to Terms & Conditions is reflective of those presented in the Host controller's Terms & Conditions page and when complete any authentication parameters captured in that process will be passed as a parameter via the web browser to the module. The third-party captive portal and authentication flow is also scripted to perform web analytics tracking events all of the user's activities from across a plurality of different venues using many different make and models of internet gateways to access this same the third-party captive portal and authentication flow.

In step 122, upon reaching the end of the 'third-party captive portal and authentication flow'/'Guest Portal flow', the flow is coded to issue 1) a HTTP redirect 302 status code or 2) to embed a link that sends the web browser to a Uniform Resource Locator (URL) address of the Terms and Condition page of the host controller along with modified GET parameters needed to trigger an authentication form submission on the Terms and Condition page, such as an "action" flag for a "YES" decision at Process 5. Thus, the third-party captive portal and authentication flow is scripted in one instance after the promo is displayed on the client device, then Guest Portal software sends an action flag in the accompanying HTTP parameters so that the module detects the action flag in step 5 and generates a HTTP POST request to submit the parameters of authentication of the user of the client device in step 124, which were solicited from the user earlier in the third-party captive portal and authentication flow for the T & C page in step 120, without requiring the user's interaction with the T & C page, and then gain access to the public Wi-Fi and/or wired network with a free internet session granted.

In step 124, the web browser has been redirected to load the controllers T&C page. The Host Portal page loads and web browser parses the JavaScript snippet with the action flag to cause the web browser to submit the authentication form automatically for the user. If an "action flag" was present in Step 110, the JavaScript snippet triggers the Target Action. In a WiFi context, the authentication form on the Host Portal Page will be submitted on behalf of the user with the appropriate HTTP POST/GET parameters to the Controller. The Controller then grants the user a Wi-Fi session allowing them to exit the Walled Garden/Captive Portal environment scripted into the controller and gain access to the open internet via the public Wi-Fi and/or wired network. The module is scripted this last step, the authentication step, should be transparent and instantaneous, without requiring the user's interaction because the JavaScript snippet module reads the parameters sent by the guest software, generates any submission form, and indicates to the web browser that the action of the user activation the icon to agree to the terms and conditions has activated/agree to. Thus, when the web browser parses the JavaScript snippet module with the action flag present, then this causes the web browser to submit an authentication form filled in with the appropriate HTTP POST/GET parameters for the user to gain access to the public Wi-Fi and/or wired network based on the user agreeing to these conditions earlier in the third-party captive portal and authentication flow.

In step 126, on the loaded T & C page, the user via the web browser manually fills out any data or parameters, clicks and agrees to any terms and conditions, and any other actions needed for submission of the authentication form.

In step 128, example additional steps may occur. After authentication, the user can be directed to a destination page and granted a Wi-Fi session. A free internet session will be granted after seeing the promo, etc. Depending on the sponsorship arrangement, the third party server may ask for control over the Destination URL. Such control may be necessary to, for example, verify a campaign target has been achieved via a transparent redirect (in which case the user would still ultimately be sent to your usual destination page). Other times, control may be necessary to redirect users to an advertiser URL. The third party flow is now complete.

Some General Points

The captive portal technique turns the Web browser on the HTTP client into an authentication device. This is done in one example by intercepting all packets, regardless of address or port, until the user opens a browser and tries to access the Internet. In some embodiments, since the third party flow and its one or more web pages are to be presented to the client device, either this 1) third party flow and its one or more web pages are locally stored in the gateway, or 2) the web server hosting that third party webpage is "whitelisted" via a walled garden to bypass the authentication process. Depending on the feature set of the gateway, multiple web servers can be whitelisted (say for iframes or links within the login page). In addition to whitelisting the URLs of web hosts, some gateways can whitelist TCP ports.

The module with its embeddable and downloadable portions can be implemented in order to display advertisements to users connecting to guest networks at a variety of different hotel, airport and cafe locations. The module with its embeddable and downloadable portions and the logic/software on the third party guest server allows for central management, hosting and standardization of 1) advertising content 2) web analytics tracking events 3) targeting criteria across thousands of different venues using many different make and models of internet gateways.

The module with its embeddable and downloadable portions ease integration and wide compatibility with disparate hardware setups and network configurations is unmatched by any other existing technique. In addition, the module with its embeddable and downloadable portions is fault tolerant, ensuring higher availability for getting connected to wifi than a comparable external authentication scenario.

As discussed, this coded module works with a host controller that has a captive portal feature with a terms and conditions page that can be customized. Depending on the host controller's brand, this feature may be called many different names such as "T&C page", "WiFi Sign-in Page", "Splash page", or "Login page". The "T&C page" generally satisfies the following conditions:

Is the first page a user sees when connecting to the wi-fi or wired network.
Users are redirected back to this page if they type a URL in their address bar until they interact with the page.
Can be configured to require only acceptance of the terms or the press of a button Example White Listing Process Since the third party flow is hosted externally (i.e. at http://nimbus.c9w.net/ . . . ), the host controller will first add nimbus.c9w.net (173.203.125.192) to the white list (also known as a Walled Garden Policy, a list of hosts and IPs that can be reached prior to authentication) and then depending on the promotion, additional hosts and IP addresses may have to be added to the white list as well.

Example JavaScript

Once in receipt of the example embeddable portion of the module (JavaScript snippet), it should be pasted in the HEAD section of your T&C page's HTML. Example embeddable portion of the module can look similar to:

```
<!-- BEGIN CLOUD9 REDIRECT SNIPPET -->
<script type="text/JavaScript" charset="utf-8">
window.___VENUE_ID___ = "YOUR_VENUE_ID_HERE";
var asset_host = "https:" == document.location.protocol ?
"https://nimbus.c9w.net" : "http://nimbus.c9w.net";
document.write(unescape("%3Cscript src='" + asset_host + "/wifi/" +
___VENUE_ID___ + "/asset.js'
type='text/JavaScript'%3E%3C/script%3E"));
</script>
<script type="text/JavaScript" charset="utf-8">
var c9options = { };
c9options.venueId = ___VENUE_ID___;
c9options.formIndex = 0;
var c9widget = new __c9.RedirectWidget(c9options);
c9widget.pageLoad( );
</script>
<!-- END SNIPPET -->
```

As discussed, an executable routine is downloadable to automatically modify the T&C page's HTML along with this embeddable portion of the module scripted in JavaScript.

Since the flow is customized and tracked on a venue-by-venue basis, every property participating in the sponsorship will be assigned a venue id. The venue_id is a string and can be set to match whatever id system that organization uses internally to identify its properties so that it can be programmatically passed into the T&C page HTML. The standard experience can be tailored to the venue ID.

The module can be integrated with very little modification as a JavaScript snippet into any existing wifi T&C page. The module is a near 100% client-side solution for injection of a third-party captive portal and authentication flow without trying to directly interface with APIs or internal protocols of the gateways/controllers. Because the module relies primarily on client-side JavaScript coding to be parsed and responded to by the web browser application in the client, integration time with a captive portal of diverse gateway/controller equipment is dramatically reduced. The solution brings together many areas of expertise, requiring knowledge of HTTP, web servers, JavaScript, captive portals, and Wi-Fi Controllers. Its development also requires integration experience with a multitude of different Wi-Fi equipment models and network providers. Because the fetched downloadable portion of the module is hosted on and comes from the third party server, modifications to the coding, flow and other features of the module are easily changeable and updatable across all of the instances of gateways/controllers with the embeddable portion of the module.

Note, the HTTP response status code 302 Found is the most common way of performing a redirection. Popular web browsers and frameworks implement the HTTP 302 redirect status code with the functionality of a 303 status code. Initially, redirection to the Destination URL can typically achieved by configuring your controllers to point to the following example URL: http://edge.c9w.net/wifi_dest.html?dest_url= . . . &venue_id= . . .

GET Parameters

'dest_url' Indicates to the redirection script where to send the user by default if the campaign does not specify a destination url (i.e. a hotel's homepage).

'venue_id' Indicates to the redirection script the venue associated with the session. venue_id. The venue specific ID. Is associated on a per device or per location level. This is usually the provider or brand name followed by an underscore and a numeric id. Example: XYZ_123456 Here, 123456 is the internal venue id used by the wifi provider, XYZ.

Some examples of parameters being transmitted within the URI field via the web browser.

Promo Redirect http://nimbus.c9w.net/wifi/[venue_id]/redirect/

Our splash page will take them to the url above where they will be issued a 302 redirect to either a promo or onwards toward authentication, depending on the UA string and the user's promo interaction history.

Promo http://nimbus.c9w.net/wifi/[promo_id]/

The user will see a promo such as "Set your Homepage to Google.com" where they can click Accept or Deny to continue. Other potential promos include a small video ad that (with the option to skip).

Login http://nimbus.c9w.net/wifi/[venue_id]/login/

After accepting or rejecting the promo, the web browser of the client device will be redirected to the Login phase where the snippet will issue either a 302 Redirect to the login_url provided in step 4 of the flow, or where the snippet will issue a server side HTTP POST to the same url for the purposes of authenticating the user.

Based on the customer and potential venue of that customer, coding in the server calls for an instance for the guest software which fills in references to the customer home page including data/parameters such as the raw template code/html of the customer's default home page, a link to the live page, rendered HTML source code of the live page if the page is not publicly accessible, and additional information or documentation you might have related to setting up/configuring the T&C page. The downloadable portion of the snippet of JavaScript can be specifically customized for each venue or each service provider's T & C page.

Referring back to FIG. 2, FIG. 2 illustrates a network environment 200 in which the techniques described may be applied. The network environment 200 has a network 202 that connects S servers 204-1 through 204-S, and at least one or more clients 208-1. As shown, the S amount of servers 204-1 through 204-S and C amount of clients 208-1 are connected to each other via a network 202, which may be, for example, the Internet. Note, that alternatively the network 202 might be or include one or more of: an optical network, the Internet, a Local Area Network (LAN), Wide Area Network (WAN), satellite link, fiber network, cable network, or a combination of these and/or others. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 208-1 and 204-S can both initiate and respond to communications, their communication may be viewed as peer-to-peer. Likewise, communications between 204-1 and 204-S, and 208-1 and 208-C may be viewed as peer to peer if each such communicating device is capable of initiation and response to communication.

The computing device such as a lap top may operate in this networked environment using logical connections to one or more remote computers, servers, routers, etc. A browser application may be resident on the computing device and stored in the memory.

When used in a LAN networking environment, the computer is connected to the LAN through a network interface or adapter. When used in a WAN networking environment, the computer typically includes a modem or other means for establishing communications over the WAN, such as the Internet. The modem, which may be internal or external, may be connected to the system bus via the user-input interface, or other appropriate mechanism.

The wireless communication module may employ a Wireless Application Protocol to establish a wireless communication channel. The wireless communication module may implement a wireless networking standard such as Institute of Electrical and Electronics Engineers (IEEE) 802.11 standard, IEEE std. 802.11-1999, published by IEEE in 1999.

FIG. 2 also illustrates a block diagram of an embodiment of a server to display information, such as a web page, etc. The application, such as the ISIS, when executed on a server 204, causes the server 204 to display windows and user interface screens on a portion of a media space, such as a web page. A user via a browser from a client machine 208 may interact with the page, and then supply input to the query/fields and/or service presented by a user interface of the application. The web page may be served by a web server 204 on any HTML or WAP enabled client device 208 or any equivalent thereof such as a mobile device or personal computer. The client device 208 may host a browser to interact with the server.

When the web browser fetches a file (a page, a picture, etc) from a web server, the web browser issues a Hypertext Transfer Protocol HTTP request for some file (e.g. "Get me the file 'home.html'"), and the web server sends back a response ("Here's the file", followed by the file itself). The request method is usually either "GET" or "POST". Basically if you fill in and submit a form on a web page it might generate a POST request (or it might be "GET"), whereas if you just click on a link, or activate one of your browser's "bookmarks" or "favorites", then the request method will always be "GET". Every time a web server provides you with a response (a page, a graphic, etc), it has the opportunity to send your browser a "cookie". These cookies are small pieces of information which your browser stores, and then sends back to that same web server whenever you subsequently request a document.

Each application, widget, Snippet, Plug in, etc. has a code scripted to perform the functions that the software component is coded to carry out such as presenting fields and icons to take details of desired information. The applications may be hosted on the server and served to the browser of the client machine 208 of the customer. The applications then serve pages that allow entry of details and further pages that allow entry of more details. Any application and other scripted code components may be stored on a computing machine readable medium which, when executed on the server causes the server to perform those functions.

In an embodiment, the software used to facilitate the functions and processes described herein can be embodied onto a computing-machine readable medium. A computer-readable medium includes any mechanism that provides (e.g., stores) information in a form readable by a machine (e.g., a computer). For example, a computing-machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These routines, algorithms, etc. may be written in in a number of different programming languages such as JavaScript, C, C+, or other similar languages. Also, an algorithm may be implemented with lines of code in software, configured hardware logic gates, or a combination of both. In an embodiment, the logic consists of electronic circuits that follow the rules of Boolean Logic, software that contain patterns of instructions, or any combination of both. The module is generally scripted in a compatible programming language as the client-side web browser application resident on a client device.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The Terms and Condition page is the first web page the web browser fetches and attempts to render on a display of the client device and can go by different names including a Wi-Fi Sign-in Page, a Splash page, Login page, Host portal page, or similar webpage. The invention is to be understood as not limited by the specific embodiments described herein, but only by scope of the appended claims.

We claim:

1. A client-server environment apparatus for providing access to a network comprising:
  a module having an embeddable portion and a downloadable portion, the embeddable portion scripted to integrate with a first webpage accessible by a web browser of a client device and the downloadable portion scripted to be parsed by the web browser of the client device for injecting a portal for display via the web browser, wherein the first webpage is hosted within an iFrame,
  wherein the portal has a URL and, the embeddable portion of the module is scripted to automatically submit authentication information to provide the client device with access to the network based on a flag present in the URL,
  wherein the module is scripted to direct the web browser of the client device back to the first webpage after the web browser of the client device has been injected with the portal,
  wherein the module is scripted to white list a third party guest server by IP address or name, and
  wherein the embeddable portion of the module is scripted to cause an HTTP redirect status code be issued.

2. The client-server environment apparatus of claim 1,
  wherein the embeddable portion of the module is scripted to determine 1) an owner of a gateway or 2) a geographic location of the gateway, and
  wherein the downloadable portion of the of the module is scripted to redirect the client device to the portal based on the ownership or geographic location determined by the embeddable portion.

3. The client-server environment apparatus of claim 1,
  wherein the portal is configured to perform one or more of 1) displaying advertising, 2) maintaining a consistent guest experience, 3) delivering marketing messages, 4) track the client device, and 5) interrogate a cookie or MAC address of the client device.

4. The client-server environment apparatus of claim 1, wherein the downloadable portion of the browser is configured to be parsed by the client device for redirecting the client device to the portal.

5. The client-server environment apparatus of claim 1, wherein the embeddable portion of the module is scripted to determine if the portal has been disabled via a "disable" flag and direct the client device to the first webpage if the portal is disabled.

6. The client-server environment apparatus of claim 5,
  wherein the embeddable portion of the module is scripted to present an authorization parameter for proceeding through the first webpage based on an "action" flag, and
  wherein the embeddable portion of the module is scripted to direct the client device to the first webpage if the portal becomes unreachable after a predetermined period of time.

7. The client-server environment apparatus of claim 6,
  wherein the module is scripted to display a graphic indicating loading on the client device if the "disable" flag and the "action" flag are found by the module, and
  wherein the module is scripted to pass a URL of the first webpage to the portal.

8. The client-server environment apparatus of claim 1, wherein the downloadable portion of the module is scripted to redirect the client device to one or more third party webpages that require two or more of the following 1) authentication of a user, 2) payment, 3) agreement to a policy, 4) viewing of an advertisement.

9. The client-server environment apparatus of claim 1, wherein the client device is directed to the first webpage if 1) the portal is unreachable, 2) the client device does not have JavaScript enabled, or 3) advertisements could not been allocated for the client device.

10. The client-server environment apparatus of claim 1, wherein the embeddable portion of module is scripted to allow a connection to be turned on or off for 1) a particular user or 2) a given venue location.

11. The client-server environment apparatus of claim 1, wherein the portal is configured to present an advertisement to the client device and perform web analytics tracking events for the client device.

12. The client-server environment apparatus of claim 4, wherein the redirecting of the client device to the portal is based on setting a location property of an active window to the URL of the portal and transmitting a parameter indicating a URL of the first webpage.

13. The client-server environment apparatus of claim 1,
  wherein the portal is configured to send an "action" flag to the module after the client device accesses the portal, and
  wherein the module is scripted to detect the "action" flag and send an authentication parameter of a user of the client device to the portal.

14. The client-server environment apparatus of claim 4, wherein the module is scripted to send a cookie and an HTTP GET parameter to the portal.

15. The client-server environment apparatus of claim 4, wherein the module is scripted to transmit information used for determining whether the client device should be directed through the portal flow in lieu of the sign-on via the first webpage.

16. The client-server environment apparatus of claim 1, wherein the portal and includes a plurality of webpages served by a server that include 1) agreement to Terms & Conditions and 2) advertisements for display on the client device.

17. A method of authenticating a client device during sign-in to a network, comprising:
  connecting a gateway with the client device, the gateway having a first webpage accessed by a web browser of the client device, wherein the first webpage is hosted within an iFrame;
  injecting a portal having a URL to the web browser after the web browser undergoes a sign-on process via the gateway;
  automatically submitting authentication information to provide the client device with access to the network based on a flag present in the URL;

directing the web browser of the client back to the first webpage of the gateway after the web browser of the client device has accessed the portal;

white listing a third party guest server by IP address or name; and issuing an HTTP redirect status code.

* * * * *